Nov. 10, 1925.
O. A. COLBY
1,561,309
COMBINED TOASTER AND TABLE STOVE
Filed Oct. 11, 1923    2 Sheets-Sheet 1
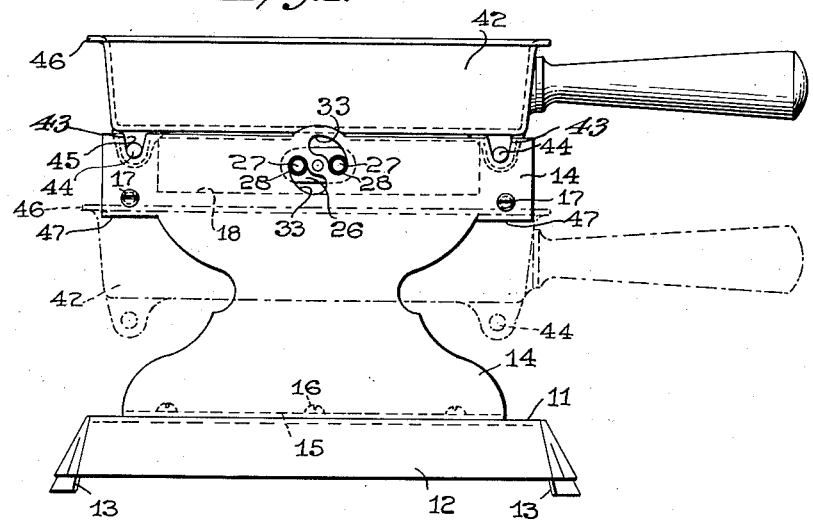
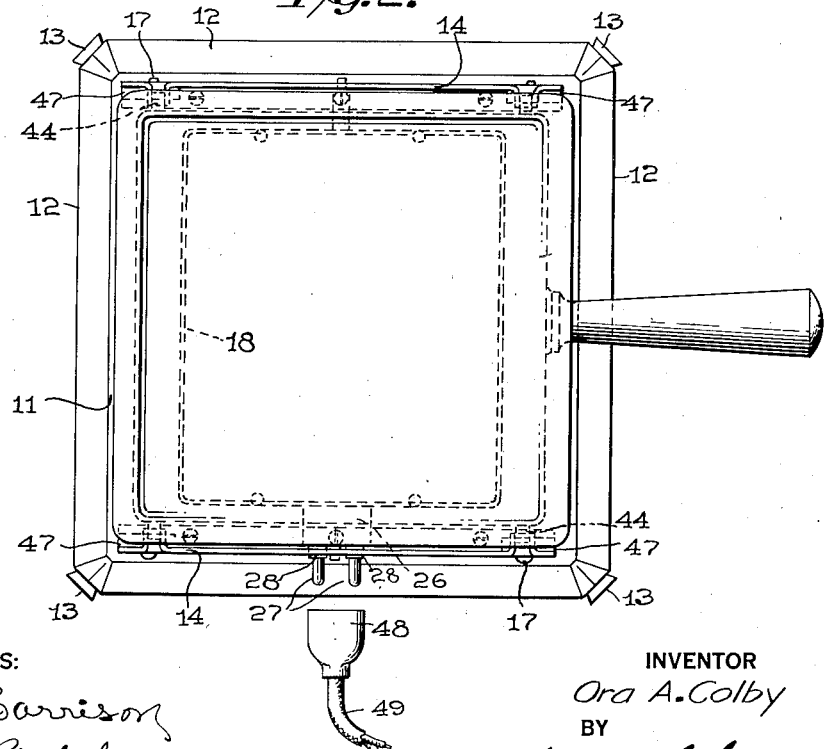
WITNESSES:
INVENTOR
Ora A. Colby
BY
ATTORNEY Nov. 10, 1925.
O. A. COLBY
1,561,309
COMBINED TOASTER AND TABLE STOVE
Filed Oct. 11, 1923
2 Sheets-Sheet 2
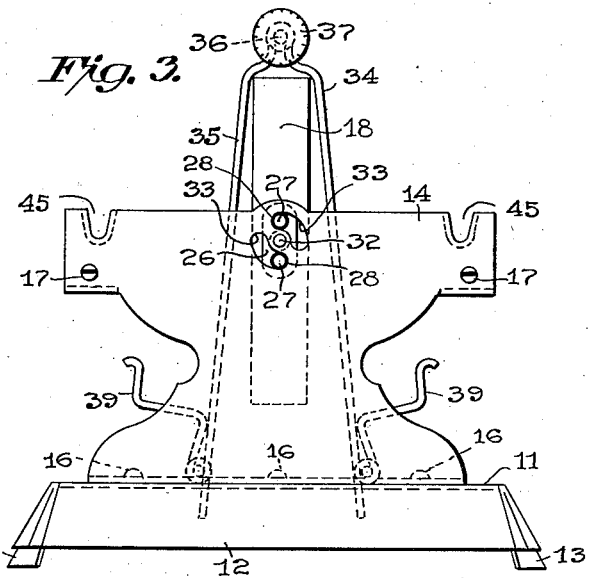
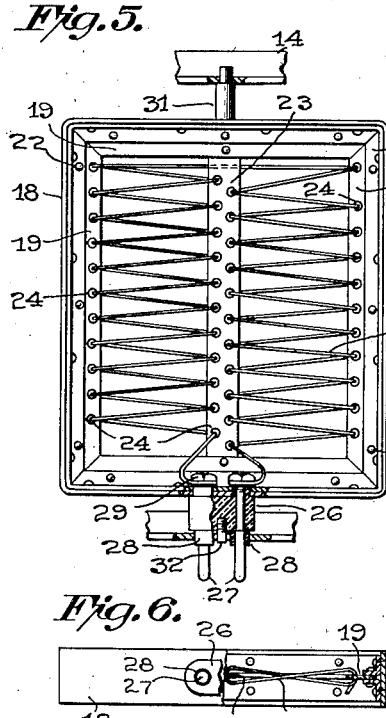
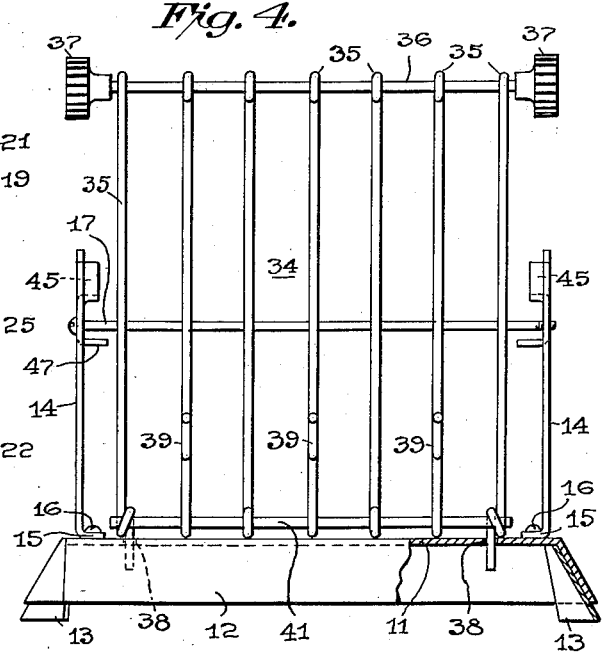
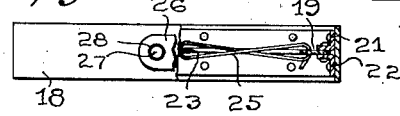
WITNESSES:
R. S. Harrison
A. M. Biebel
INVENTOR
Ora A. Colby
BY
Wesley G. Carr
ATTORNEY Patented Nov. 10, 1925.

1,561,309

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

COMBINED TOASTER AND TABLE STOVE.

Application filed October 11, 1923. Serial No. 667,870.

To all whom it may concern:

Be it known that I, ORA A. COLBY, a citizen of the United States, and a resident of Irwin, in the county of Westmoreland and State of Pennsylvania, have invented a new and useful Improvement in Combined Toasters and Table Stoves, of which the following is a specification.

My invention relates to electric heating devices and particularly to portable electric cooking devices.

The object of my invention is to provide a relatively simple and compact electric cooking device comprising relatively few parts, that shall be operable either as a vertical toaster or as a table stove.

In practicing my invention, I provide a sheet metal frame within which an electric heating unit is pivotally mounted for selectively positioning it in a vertical or in a horizontal position. A wire rack is mounted on the base of the frame in the heating unit and it not only supports slices of bread to be toasted, adjacent to the heating unit, but it also holds the unit in its proper operative position. Means are provided on the frame for supporting a cooking utensil either above or below the heating unit when the same is in a horizontal position.

In the drawings,

Figure 1 is a view, in end elevation, of a device embodying my invention when operated as a table stove, Fig. 2 is a top plan view thereof, Fig. 3 is a view, in end elevation, of a device embodying my invention operating as a vertical toaster, Fig. 4 is a view, in side elevation, of a frame and toast rack constituting a part of the device embodying my invention, a portion being cut away to show the construction thereof, Fig. 5 is a top plan view of a heating unit and a part of a supporting frame, and Fig. 6 is a view, partly in end elevation and partly in section, of a heating unit embodied in the heating device.

A base 11 may comprise a relatively thin plate of sheet metal that is substantially rectangular in contour and is provided with a plurality of integral and depending flange portions 12. A plurality of heat insulating supporting members 13 are provided and may be secured to the opposing ends of the flange portions 12 in any suitable or desired manner. A frame for the device comprises a pair of punched and formed sheet metal side walls 14 that are mounted on, and supported by, the top portion of the base 11, being spaced a suitable distance apart.

The bottom of each of the side walls 14 may be provided with an inturned flange portion 15 which is secured against the top of the base 11 by a plurality of screws or rivets 16. The upper ends of the side walls 14 may be maintained in proper spaced relation relatively to each other by a pair of metal rods 17 that are secured to each of the side wall panels in any suitable or desired manner.

A heating unit for the device comprises a substantially rectangular frame 18 of relatively thin sheet metal supporting a plurality of relatively thin and narrow strips 19 of a suitable electric-insulating material, such as mica. Any suitable or desired means for securely holding the strips of mica 19 may be provided, but I have illustrated relatively light strips 21, of L-shape in lateral section, riveted against the inside of the member 18 at the sides thereof.

The mica strips 19 are secured between the two members 21 by a plurality of small rivets 22. An intermediate strip 23 of mica is located between the two outer strips 19, all three strips being provided with a plurality of spaced perforations 24 therethrough. A resistor member 25 is suitably wound between the intermediate strip 23 and the respective outer strips 19 in the manner illustrated in Fig. 5 of the drawing.

This method of winding the resistor member permits of exposing it substantially throughout its length, whereby substantially all of the heat generated therein can be dissipated by direct radiation when the resistor is operated at substantially a radiant temperature.

A block 26 of a suitable refractory electric-insulating material is held against one end surface of the frame 18 by a pair of spaced terminal pins 27 that are each provided with a tubular member 28 of electric insulating material securely mounted thereon. The pins 27 extend through suitable openings in the frame 18 and are held thereagainst by nuts 29 that also serve to hold the ends of the resistor member 25 against the respective terminal pins 27. This type of relatively light and open heating unit is more particularly disclosed and claimed in my co-pending application, Serial No. 667,869, filed Oct. 11, 1923, and assigned to the Westinghouse Electric & Manufacturing Company, to which application reference may be had for further details.

The heating unit hereinbefore described is pivotally mounted in the two side wall members 14 by a pair of pivot pins 31 and 32 that are suitably secured to the frame 18 at the respective ends thereof and rest in suitable openings provided in the two side wall members 14. Two openings 33 of arcuate form are provided in one of the side wall members 14 and the terminal pins 27 extend through these openings and co-operate therewith to limit the turning movement of the heating unit in both a horizontal and in a vertical direction. The tubular insulating members 28 on the pins 27 operatively engage the member 14 in the openings 33, whereby the pins are insulated from the side members.

When it is desired to employ the device as a vertical toaster, the heating unit is moved to substantially the position illustrated in Fig. 3 of the drawing, and a combined material-supporting and heating-unit-positioning means 34 is operatively mounted on the base 11. The member 34 comprises a plurality of wire members 35 bent to substantially U-shape, the upper rounded portion being securely clamped around a rod or wire 36, that is provided at each end with a lifting knob 37. The end members 35 of the group may be provided with integral depending portions that fit into, and extend through, openings 38 provided in the top of the base 11 in order to position the member 34 relatively to the base 11. Intermediate members 35 are provided with integral and laterally extending portions 39, of substantially L-shape, and so bent as to provide a rest for the bottom edge of slices of bread that may be placed thereon and leaned against the outer surface of the group of members 35.

The lower ends of the rods or wire members 35 are suitably secured against a horizontally extending rod 41 and any suitable or desired method of securing the rods or wire members 35 to the rod 41 may be employed and I have shown a method in which the lower end of certain of the rods 35 is given one turn around the rod 41. If desired, the members 35 may be welded to the rod 41.

The assembled rack comprising the members 35, of substantially bent form and the rods 36 and 41, may be easily and quickly removed from, or placed in, its proper operative position and when mounted in substantially the position illustrated in Fig. 3 of the drawing, it serves not only to support pieces of bread being toasted adjacent to the heating element, but it also serves to hold the heating unit in substantially a vertical position.

When it is desired to employ the device embodying my invention as a table stove or grill, the rack hereinbefore described is removed, the heating unit is given a turning movement to substantially a horizontal position and a cooking utensil 42 may be operatively associated therewith and be located either above or below the heating element.

The cooking utensil 42 may be provided with integral depending lugs 43 that are severally provided with inwardly extending pins 44 that are adapted to fit into slots or grooves 45 provided in the side members 14 adjacent to the top and sides thereof. The relative locations of the co-operating parts is such that the cooking utensil 42, here illustrated as a sauce pan, is located with its bottom surface closely adjacent to and above the hereinbefore described heating unit.

If it is desired to support the utensil 42 below the heating element, as may be necessary in broiling, the out-turned integral top flange portions 46 thereof engage integral and inwardly extending flange portions 47 of the respective side members 14.

A standard plug 48, having a twin supply circuit conductor 49 connected thereto, may be provided to operatively engage the terminal pins 27 in either of the two limiting positions of the heating unit illustrated in Figs. 1 and 3 of the drawing to energize the heating unit.

The device embodying my invention is thus relatively simple and compact comprising a pivotally mounted heating unit that may be moved to either a vertical or a horizontal position and that co-operates with material-supporting means in either position.

Various modifications and changes may be made without departing from the spirit and scope of the invention, I desire therefore, that only such limitations shall be placed thereon as are imposed by the prior art or are set forth in the appended claims.

I claim as my invention:

1. In an electric cooking utensil, in combination, a frame, a single flat, open heating unit pivotally mounted in said frame and adapted to be swung to either a horizontal or a vertical position, and a plurality of insulated terminal members co-operating with said frame to limit said swinging movement.

2. In an electric cooking utensil, in combination, a frame, a single flat, open heating unit pivotally mounted in said frame and adapted to be swung to either a vertical or a horizontal position, and a combined material-supporting and heating-element-locking means removably mounted on said frame for holding said heating element in a substantially vertical position.

3. In an electric cooking utensil, in combination, a frame, a single flat, open heating unit pivotally mounted in said frame and adapted to be swung to either a vertical or a horizontal position, and a single means for holding material to be cooked adjacent to each side of said heating element and for holding said element in a substantially vertical position.

4. In an electric cooking utensil, in combination, a frame, a single flat, open heating unit pivotally mounted in said frame and adapted to be swung to either a vertical or a horizontal position and means on said frame for permitting the removable support of a cooking utensil above and below said heating element when in its horizontal position.

5. In an electric cooking utensil, in combination, a frame, a single flat, open heating unit pivotally mounted in said frame and adapted to be swung to either a vertical or a horizontal position and means on said frame for permitting the simultaneous removable support of a plurality of cooking utensils above and below said heating unit when in its horizontal position.

In testimony whereof, I have hereunto subscribed my name this 6th day of October, 1923.

ORA A. COLBY.